2 Sheets—Sheet 1.
P. M. J. CHAVANETTE.
Machine for Expressing the Juice from Grapes, &c.
No. 224,648. Patented Feb. 17, 1880.
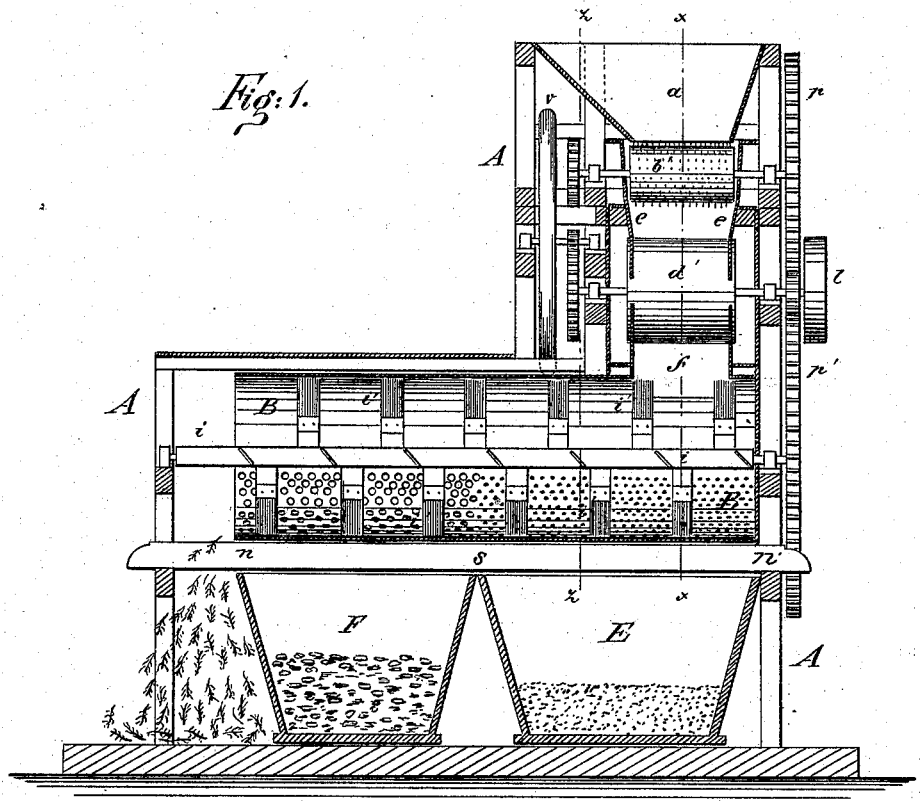
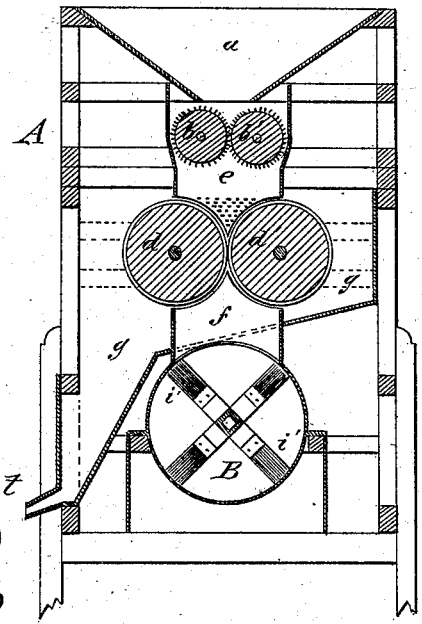
WITNESSES:
INVENTOR:

P. M. J. CHAVANETTE.
Machine for Expressing the Juice from Grapes, &c.
No. 224,648. Patented Feb. 17, 1880.
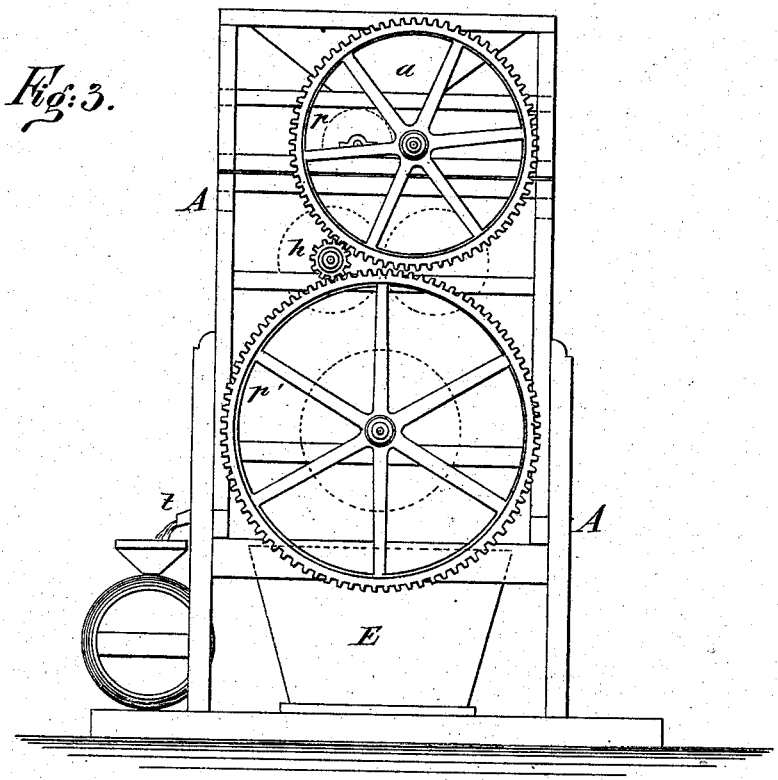
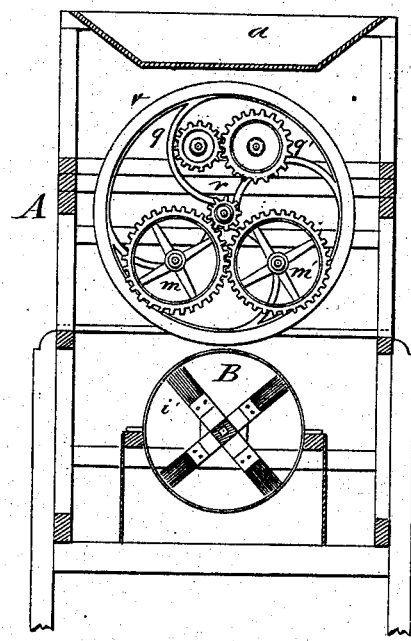

UNITED STATES PATENT OFFICE.

PIERRE M. J. CHAVANETTE, OF PARIS, FRANCE, ASSIGNOR TO AUGUST F. W. PARTZ, OF PHILADELPHIA, PENNSYLVANIA.

MACHINE FOR EXPRESSING THE JUICE FROM GRAPES, &c.

SPECIFICATION forming part of Letters Patent No. 224,648, dated February 17, 1880.

Application filed June 3, 1879. Patented in France, July 13, 1876.

*To all whom it may concern:*

Be it known that I, PIERRE M. J. CHAVANETTE, of Paris, France, have invented a Machine for Expressing the Juice from Grapes and separating their solid parts, of which the following is a specification.

The object of this invention is to effect, in a simple and expeditious manner, the extraction of the juice from grapes, and at the same time a complete or partial separation of their pips, pellicles, and stems, so that the wine-maker may readily obtain his material in such a condition as to enable him to produce not only the best wine that can be had from a given kind of grapes, but also from dark grapes a white or a light-red wine, by keeping out of the must either all or a certain portion of the pellicles which contain the coloring-matter.

The invention consists in a machine composed, principally, of two devices—one for feeding, mashing, and pressing the grapes, and separating their juice from their solid parts, and the other for separating the latter—both being so combined as to operate systematically together, while they may be modified in different ways to make their functions respond to certain particular requirements, as will be hereinafter fully set forth.

The accompanying drawings represent a machine which embodies my invention, and of which—

Figure 1 is a vertical longitudinal section. Fig. 2 is a transverse section in the plane indicated by the dotted line *x x* in Fig. 1. Fig. 3 is an elevation showing that end of the machine which is at the right hand in Fig. 1; and Fig. 4 is a transverse section, showing those parts of the machine which are to the left of the dotted line *z z* in Fig. 1.

A is a substantial wooden frame partly covered with boards or sheet metal. *a* is a hopper, into which the grapes are to be thrown. *b b'* are two cylinders of equal diameter, intended to turn at a different speed, as will be seen from the different size of the spur-wheels *g g'*, by which they are connected, and which receive their motion by means of a spur-wheel *p*, and a pinion, *h*, from the driving-shaft, which carries the pulley *l*.

Both cylinders are furnished all around with pointed teeth, and placed just far enough apart so that when they revolve their teeth do not touch. The office of these cylinders is not only to mash the grapes that descend from the hopper, but also to govern and regulate their descent, and thus to serve as feeders. Instead of being furnished with teeth, they may be made with ribs running parallel with their axes or in oblique lines.

*d d'* are two other cylinders of equal diameter, connected by like-sized spur-wheels *m m'*, one of which, *m*, engages with a pinion, *r*, fixed upon a short shaft, which bears a fly-wheel, *v*, for regulating the motion.

The shaft of the cylinder *d* and the spur-wheel *m* is also the driving-shaft of the machine. The two last-named cylinders are covered with vulcanized india-rubber about half an inch thick and placed in close contact with each other. Near their ends, and almost touching them with their lower edges, are two upright metallic screens, *e e*, fastened to the frame A.

The grapes mashed by the toothed cylinders *b b'* drop upon and are caught and pressed by the cylinders *d d'*, and while their stems and other solid parts are forced through between them and fall through a funnel, *f*, into a stationary drum, B, the juice escapes sidewise through the screens *e e* and flows down an incline, *g*, surrounding the funnel *f*, and through a tube, *t*, into a barrel or other vessel. As the pressing-cylinders *d d'* are made to revolve at a much greater speed than the feeding and mashing cylinders *b b'*, they are not liable to get choked, though the hopper be kept filled with grapes.

The drum B is closed at the end *n'* and open at the end *n*, having, besides, a square opening on top below the cylinders *d d'*. Its lower half, which can be detached, consists of sheet metal perforated with round holes of two different sizes, those between *n'* and *s* being about a fourth of an inch, and those between *s* and *n* about an inch, in diameter. It may also be made of wire-cloth with meshes of corresponding sizes.

Through the the center of the drum extends a shaft, *i*, which is geared, by a spur-wheel, *p'*, to the pinion *h*, and upon which are fastened four rows of flat brushes, *i' i'*, all placed in a helicoidal position, their ends touching the inner face of the drum. They are made of split reeds, or of twigs, wires, or other suitable hard and flexible material. The rotation of these brushes causes the solid parts of the grapes entering the drum from above at the end *n'* to be agitated so as to become detached from each other, and while they are gradually swept toward the end *n* the pips escape through the perforations between *n'* and *s* and the pellicles through those between *s* and *n*, both dropping into separate vessels, E and F, placed underneath, leaving the stems alone to be discharged at the end *n*.

To convert by this machine about one hundred bushels of grapes per hour requires the application of a horse-power and the attendance of two or three men. For operating on a small scale a crank may be substituted for the pulley *l* and the machine be driven by hand, when it will convert from twelve to fifteen bushels per hour.

Now, if dark grapes have been worked in the above-described manner, and it be the intention to produce a white wine, only the pips, or enough of them to supply the tannic acid that may be deemed necessary, are to be added again to the juice, to remain with it until it begins to ferment. If wine of a light-red color be desired, a certain portion of the pellicles is likewise to be added. In making wine from white grapes it is generally advisable to readd to the juice not only a part or all of the pips, but also of the pellicles, since it is the temporary presence of both of them in the must to which wines owe some of their most valued properties, among them their aroma, (bouquet,) which they obtain chiefly from the pellicles.

The stems should be rejected under all circumstances, as they only impart to the wine a disagreeable acerbity and rawness of taste.

In making dark-red wine the must has to go with the pellicles into fermentation in order to extract from them sufficient coloring-matter, and, as it takes up more tannin than is commonly desired when it ferments also with the pips, they are to be kept out of it, unless it be the object, which it not unfrequently is, to produce a wine containing a high percentage of tannin. In this case it is not necessary that the juice be obtained by itself and the pips be separated from the pellicles. Therefore the incline *g*, with the funnel *f*, may be taken out and replaced by a funnel the upper part of which is wide enough to surround the cylinders *d d'*; and for the section *n' s* of the lower part of the drum B may be substituted one with perforations of the same size as those of the section *s n*, so that the juice, pips, and pellicles pass together into the same receptacles underneath. Nor is it necessary in this case that the cylinders *d d'* be covered with india-rubber, and it being mainly required to have the grapes mashed and the stems separated, those cylinders may even be dispensed with.

After the must from any kind of grapes has remained, together with the pips or pellicles, or both, sufficiently long to take up from them those substances which give to the wine certain characteristic and desirable qualities, such as a peculiar and pleasant flavor and a good color, the liquid portion of the mash, so far as it cannot be simply drawn or screened off, may be separated from the solid portion by any common wine-press; but the separation can be more speedily effected by the mash being passed again through the above-described machine, and this operation has, moreover, the advantage that the pips can be obtained by themselves and utilized by the extraction from them of an excellent oil. However, when the machine is thus employed, the cylinders *b b'*, having to serve solely as feeders to the cylinders *d d'*, should be ribbed or grooved parallel with their axes and connected by gear-wheels of equal size; and to provide for an easy exchange of those cylinders and wheels, as also to facilitate the cleaning of the machine, that part of it which is above the cylinders *d d'* is put on in such a manner that it can readily be taken off.

The drum B, instead of being horizontal, may be placed in a position sufficiently inclined to admit of the brushes *i' i'* being so fixed upon the shaft *i* that their broad faces are in line with the same. Moreover, flat arms of wood or metal, with pieces of sheet india-rubber or some other suitable flexible substance attached to their ends so as to touch the inner face of the drum, may be substituted for the brushes, though the latter are to be preferred.

It will be seen that by the aid of this machine the wine-maker can not only accomplish a large amount of work in a short time and with comparatively little power and labor, but also vary at will and in divers ways the qualities of his product and always make the best of his material, which he was practically unable to do with the mechanical means hitherto at his command.

To render the machine conveniently portable it may be mounted on wheels.

I claim as my invention—

1. In combination with the rubber-covered cylinders *d d'* and the screens *e e*, the incline *g*, with inserted funnel *f*, arranged below the said cylinders, for the purpose of separating the juice from the solid parts of the grapes, substantially as described.

2. In a grape-machine, the stationary perforated drum B, containing the shaft *i*, furnished with brushes *i' i'*, for the purpose of separating the pips, pellicles, and stems of the grapes previously mashed or pressed, substantially as described.

PIERRE M. J. CHAVANETTE.

Witnesses:
JOHN C. WILLIAMSON,
JUL. L. PARTZ.